United States Patent [19]

Gross

[11] 4,411,773

[45] Oct. 25, 1983

[54] HEAT BALANCE IN FCC PROCESS AND APPARATUS WITH DOWNFLOW REACTOR RISER

[75] Inventor: Benjamin Gross, Cherry Hill, N.J.

[73] Assignee: Mobil Oil Corporation, New York, N.Y.

[21] Appl. No.: 403,685

[22] Filed: Jul. 30, 1982

Related U.S. Application Data

[63] Continuation-in-part of Ser. No. 217,879, Dec. 18, 1980, Pat. No. 4,356,082.

[51] Int. Cl.³ .................. F27B 15/10; F27B 15/14; F27B 15/16
[52] U.S. Cl. .................................. 208/164; 208/159; 422/146; 502/41
[58] Field of Search .................. 208/164, 163, 159; 422/146; 252/417

[56] References Cited

U.S. PATENT DOCUMENTS

| | | | |
|---|---|---|---|
| 2,477,042 | 7/1949 | Burnside | 208/164 X |
| 2,735,743 | 2/1956 | Rex | 422/146 X |
| 2,962,362 | 11/1960 | Moorman | 422/146 X |
| 2,963,422 | 12/1960 | Hann | 422/146 X |
| 3,074,878 | 1/1963 | Pappas | 208/127 |
| 3,161,583 | 12/1964 | Pohlenz | 208/164 |
| 3,410,793 | 11/1968 | Stranahan et al. | 208/159 |
| 3,565,790 | 2/1971 | Schwarzenbek | 208/153 |
| 3,707,463 | 12/1972 | Harter et al. | 208/164 |
| 3,791,962 | 2/1974 | Demmel et al. | 208/164 X |
| 3,835,029 | 9/1974 | Larson | 208/113 |
| 4,093,537 | 6/1978 | Gross et al. | 208/164 |
| 4,118,338 | 10/1978 | Gross et al. | 252/417 |
| 4,218,306 | 8/1980 | Gross et al. | 208/120 |

Primary Examiner—Delbert E. Gantz
Assistant Examiner—O. Chaudhuri
Attorney, Agent, or Firm—Michael G. Gilman; Charles J. Speciale; Stanislaus Aksman

[57] ABSTRACT

In a fluid catalytic cracking (FCC) process and apparatus, the heat balance between the reactor and the regenerator of the FCC operation is partially uncoupled by transferring at least a portion of thermal energy from the reactor vessel downflow riser to the regenerator vessel. The transfer of thermal energy results in a higher regenerating temperature. The thermal energy is recirculated to the upstream section of the downflow reactor riser through a regenerated catalyst having higher temperature. Consequently, the outlet of the reactor vessel is maintained at a substantially constant temperature (e.g., 1000° F.) and the rate of conversion of the oil feed and the octane number of gasoline produced in the process are increased.

38 Claims, 2 Drawing Figures

HEAT BALANCE IN FCC PROCESS AND APPARATUS WITH DOWNFLOW REACTOR RISER

CROSS-REFERENCE TO RELATED APPLICATIONS

This application is a continuation-in-part of U.S. application of Gross, Ser. No. 217,879, filed Dec. 18, 1980 now U.S. Pat. No. 4,356,082.

BACKGROUND OF THE INVENTION

1. Field of the Invention

This invention relates to catalytic cracking of petroleum fractions. More particularly, this invention relates to an improved process of converting easily coked petroleum fractions into coke and valuable hydrocarbon products, such as gas, gasoline, light cycle gas oil and heavy cycle gas oil in a fluid catalytic cracking reactor.

2. Description of Prior Art

Conversion of various petroleum fractions to more valuable products in catalytic reactors is well known in the art. The petroleum industry has found the use of a fluid bed catalytic cracker reactor (hereinafter FCC reactor) particularly advantageous for that purpose. An FCC reactor typically comprises a thermally balanced assembly of apparatus comprising a reactor vessel filled with a catalyst and a regenerator vessel wherein spent catalyst is regenerated. The feed is converted in the reactor vessel over the catalyst, and coke simultaneously forms on the catalyst, thereby deactivating the same. The deactivated (spent) catalyst is removed from the reactor vessel and conducted to the regenerator vessel, wherein coke is burned off the catalyst with air, thereby regenerating the catalyst. The regenerated catalyst is then recycled to the reactor vessel. The reactor-regenerator vessel assembly must be maintained in steady state heat balance so that heat generated by burning the coke provides sufficient thermal energy for catalytic cracking in the reactor vessel. The steady-state heat balance is usually achieved and maintained in the FCC reactors by controlling the rate of flow of the regenerated catalyst from the regenerator to the reactor. The rate of catalyst flow is normally controlled by means of a slide valve in the regenerator-to-reactor conduit. The degree of opening of the slide valve is controlled by a conventional controlling means coupled to a temperature sensing means (e.g., a thermocouple), placed at the outlet of the reactor, to maintain the desired temperature inside the reactor.

The product stream of the catalytic cracker is usually fractionated into a series of products, including: gas, normally conducted to gas concentration plant; gasoline; light cycle gas oil; and heavy cycle gas oil. A portion of the heavy cycle gas oil is usually recycled into the reactor vessel and mixed with fresh feed. The bottom effluent of the fractionator is conventionally subjected to settling and the solid portion of the settled product is also recycled to the reactor vessel in admixture with the heavy cycle gas oil and feed.

In a modern version of fluid catalytic cracking reactor, the regenerated catalyst is introduced into the base of a riser column in the reactor vessel. The riser column or riser serves a two-fold purpose: (1) to transfer the catalyst from the regenerator to the reactor, and (2) to initiate cracking of the petroleum feed. The regenerated hot catalyst is admixed in the riser inlet or upstream section of the riser (i.e., in the bottom of the riser column if the riser column is positioned substantially vertically and the flow of the feed and the catalyst is in the upward direction) with a stream of fresh feed and recycled petroleum fractions, and the mixture is forced through the riser column. During the passage of the catalyst and of the petroleum fractions through the riser the petroleum is cracked, and coke is simultaneously deposited on the catalyst. The fluid bed of the coked catalyst and of the cracked and reformed petroleum components is passed upwardly out of the riser and through a solid-gas separation system, e.g., a series of cyclones, at the top of the reactor. The cracked petroleum fraction is conducted to product separation, while the coked catalyst passes to the regenerator vessel, and is regenerated therein, as discussed above.

It has also been proposed to position the riser on top of the reactor vessel in such a manner that the regenerated catalyst mixed with the FCC feedstock is forced to flow downwardly (see U.S. copending application of Gross et al., Ser. No. 254,329, filed Apr. 14, 1981, the entire contents of which is incorporated herein by reference). As set forth in that copending application, the downflow configuration of the riser reactor unexpectedly improves conversion-coke and gasoline selectivity of the FCC process and increases octane rating of the gasoline produced in the process.

Further details of FCC processes can be found in U.S. Pat. Nos. 2,383,636 (Wurth); 2,689,210 (Leffer); 3,338,821 (Moyer et al); 3,812,029 (Snyder, Jr.); 4,093,537 (Gross et al); and 4,118,338 (Gross et al); as well as in Venuto et al, *Fluid Catalytic Cracking with Zeolite Catalysts*, Marcel Dekher, Inc. (1979). The entire contents of all of the above patents and publications are incorporated herein by reference.

FCC reactions are endothermic in nature with the highest temperatures of about 1000° to 1050° F. observed at the inlet of the riser and continually falling along the reaction path. The lowest outlet temperature at the riser outlet and at the top of the reactor must usually be maintained below certain limits, e.g., below about 1040° F., because of limitations in heat transfer capacity of the downstream distillation columns. In addition, excessive temperature may cause maintenance problems, such as undue riser expansion and mechanical stress on the expansion joints. Conversely, temperatures in the upstream and downstream parts or sections of the riser often reach levels much higher than those at the outlet of the riser. The term "downstream part or section of the riser" is defined herein as the riser section intermediate the inlet and the outlet of the riser, the latter being the section where the suspension of catalyst, products and unconverted feed leaves the riser. Excessive temperatures are controlled by decreasing catalyst circulation rate, which lowers the mix inlet temperature. However, decreased catalyst circulation rate may lead to more complete combustion of the coke on the catalyst. Less coke left on the regenerated catalyst increases catalyst activity. This activity increase leads to more coke yield and higher regenerator temperatures, causing the rate of the catalyst circulation to decrease even further, or, as is commonly referred to in the art, to "wind-down". This condition must be noted quickly and appropriate steps must be taken to restabilize the heat balanced operation, wherein the heat generated by regeneration of the catalyst in the regenerator does not exceed the temperature limits of optimum operation in the riser. Removal of the heat from the downstream portion of the riser to a heat sink (cooler) outside of the system, thereby uncoupling the heat balance, is inefficient because valuable heat energy is removed from the process.

It is a primary object of this invention to increase the yield of and the octane number of gasoline produced in the FCC plant containing downflow reactor riser within the temperature constraints imposed on the reactor by downstream heat removal limitations.

It is an additional object of this invention to increase temperature levels in the regenerator portion of such an FCC plant without upsetting overall heat balance of the process.

It is another object of this invention to provide an improved method of catalyst regeneration in an FCC plant with the downflow reactor riser.

It is yet another object of this invention to provide an improved FCC reactor/regenerator assembly apparatus wherein at least a portion of the downflow reactor riser is equipped with a heat exchanging means.

Additional objects and advantages of this invention will become apparent to those skilled in the art from the study of this specification and of the appended claims.

SUMMARY OF THE INVENTION

These and other objects have been attained according to this invention by providing a heat exchanging means in the downflow FCC riser, the heat exchanging means being coupled to the regenerator. The heat exchanging means decreases the temperature of the lower section of the downflow riser and increases the temperature of the regenerator. The increased temperature in the regenerator results in a more efficient regeneratiuon process. The heat is recirculated from the regenerator to the top portion of the downflow riser through the hotter catalyst, thereby resulting in a higher inlet riser cracking temperature without affecting the substantially constant outlet riser temperature. The net result of conducting the process in this manner is increased conversion of the feed to the gasoline fraction and coke and higher octane number of the gasoline obtained in the process.

DETAILED DESCRIPTION OF THE INVENTION

An FCC reactor vessel is equipped with a riser attached to the top of the reactor vessel in such a manner that the regenerated catalyst is forced to flow in a downward direction from the regenerator vessel into the reactor. The downflow reactor riser substantially eliminates the problems of back mixing of the catalyst and non-uniform distribution thereof throughout the petroleum feedstock. The petroleum feedstock is introduced into the riser either at a point of introduction of the regenerated catalyst into the riser, or immediately downstream of that point, as in a conventional upflow riser. The downward direction of the flow of the catalyst and of the feed facilitates uniform distribution of the catalyst throughout the feed in a relatively short time, thereby decreasing coke make and enabling rapid separation of the catalyst from the converted feedstock at the bottom portion of the riser. After exiting from the riser, the products of the reaction are separated from the spent catalyst in a conventional manner, e.g., by a series of cyclones in the reactor vessel, and the spent catalyst is then conducted to the regenerator vessel. The net result of providing a downflow riser in the FCC plant reactor is the decreased amount of coke produced in the process, increased gasoline selectivity of the process, production of higher octane gasoline at substantially the same gasoline efficiency, and increased catalyst efficiency.

The regenerated catalyst is removed from the regenerator vessel by a conventional means, e.g., a downwardly directed conduit or stem-pipe with a slide valve. The slide valve is controlled in a conventional manner by a control loop comprising a temperature sensing means, such as a thermocouple in the upper portion of the reactor vessel and a controller with a set point. The set point of the controller is set at such a setting as to maintain the temperature in the uppermost portion of the FCC reactor at below about 1000° F. If the temperature exceeds the set point, the slide valve in the regenerator-to-reactor conduit is activated to decrease the rate of flow of the hot regenerated catalyst from the regenerator into the reactor. The regenerator-to-reactor conduit terminates in the downflow reactor riser. The conduit is equipped at its exit end with a means facilitating efficient and uniform distribution of the catalyst throughout the cross-sectional area of the riser, comprising, for example, a circular perforated disc covering the cross-sectional area of the riser with perforations large enough to allow egress of the regenerated catalyst from the disc, or a multi-nozzle catalyst feed nozzle. The downflow riser is also equipped with a petroleum feedstock introduction means, e.g., conventional feedstock injection nozzles, placed in the immediate vicinity of the point of introduction of the regenerated catalyst into the riser. The construction of the riser is similar to that used in the upflow risers, except, of course, that it is attached to the upper section of the reactor vessel, thereby forcing downward flow of the regenerated catalyst and of the petroleum feed. The riser is made of conventional materials of construction, e.g., stainless steel, carbon steel or low chrome and molybdenum content steel, both with suitable refractory lining materials. The downflow riser is divided into an upstream and into a downstream section. The feed and the regenerated catalyst are introduced into the upstream section, while the heat exchanging means is placed around the downstream section of the downflow riser.

The dimensions of the riser are also similar to the dimensions of the upflow risers. Thus, a typical riser is 120 feet in length, and has a cylindrical shape with an inside diameter of 20–70 inches. The superficial velocity of the petroleum feedstock in the riser is about 5 ft/sec. to about 50 ft/sec., preferably about 10 ft/sec. to about 40 ft/sec., and most preferably 15 ft/sec., to about 35 ft/sec. The inside surface of the riser may also optionally be equipped with baffles to facilitate more thorough mixing of the regenerated catalyst with the feed and to provide means for controlling residence time of the feed in the riser. The residence time in the downflow riser varies from 0.2 seconds (sec.) to 10 sec., preferably 0.3 sec. to 4 sec., most preferably 0.4 sec. to 2 sec. According to preliminary calculations, in an FCC process using gas oil as the feed, residence time can be reduced from about 5 sec. in an upflow riser to about 2 sec. in a downflow riser at otherwise identical process conditions. The decrease results in 20 to 30 percent less coke make; in about 20 percent less catalyst for the same conversion; and, in about 1 percent more gasoline at the same conversion.

The catalyst and petroleum feedstock mixture travels rapidly to the reactor where the catalyst and products of the reaction are quickly separated from each other. Coke is deposited on the catalyst as a by-product of the reaction. The now spent catalyst (i.e, coked catalyst) is transferred to the reactor stripper which steam-strips entrained hydrocarbons from the catalyst and returns the hydrocarbons to the reactor for recovery. The recovery of the hydrocarbons removed from the catalyst and those produced in the cracking process during the passage of the feedstocks through the riser and through the reactor is accomplished in a solid-gas separation system, e.g., a series of cyclones at the top of the reactor. The cracked petroleum fraction is conducted to product separation, while the coked catalyst is passed to the regenerator vessel and is regenerated therein as in the prior art FCC plants. Any conventional previously known regenerator vessel can be used with the improved process and apparatus of this invention. Accordingly, the placement of the regenerator-to-reactor conduit will depend on the type of the regenerator used. However, the placement of the conduit for every design of the regenerator will be such that it insures a steady and continuous flow of the substantially regenerated catalyst into the riser.

The process of this invention can be operated with any feedstock material conventionally used in FCC plants. Thus, suitable feed materials include such hydrocarbon feedstocks as naphthas, gas oil, vacuum gas oil, light and heavy distillates, residual oils and the like. However, due to the fact that the downflow reactor riser configuration used in this invention minimizes the coke formation and increases the gasoline selectivity of the catalyst, preferred feedstocks for the process of this invention are those feedstocks which normally have a relatively high propensity to form coke in FCC processing operations. Such preferred feedstocks are generally heavier stocks, e.g., Arab heavy oil, HDT (hydrotreated) vacuum resids and gas oils. As used herein, heavy oil feedstocks are those feedstocks which are characterized by high endpoints (greater than 1050° F.), high CCR contents (3% or more) and high amounts of multi-ring aromatic compounds (more than about 15%).

Similarly, although, as stated above, any regenerator vessel design can be used with the improved process and apparatus of this invention, it is particularly preferred to use fast fluidized regenerator vessels because they provide efficient regeneration of the spent catalyst in a relatively short period of time and therefore they are more compatible with the downflow riser design used in this invention which reduces residence time of the catayst in the reactor riser. The design and operation of one fast fluidized regenerator is set forth in detail in U.S. Pat. No. 4,118,338, issued to Gross et al., on Oct. 3, 1978 and briefly summarized below in conjunction with the discussion of the design and operation of one embodiment of this invention shown in FIG. 1. The entire content of the Gross et al., U.S. Pat. No. 4,118,338 is incorporated herein by reference.

The process of this invention can be used in conjunction with any catalyst conventionally used in the FCC processes, e.g., zeolites, silica-alumina, and zeolites with carbon monoxide burning promoters. Such carbon monoxide burning promoters or carbon monoxide burning catalysts include: platinum metals, e.g., platinum, palladium, rhodium, ruthenium, iridium, and osmium; and rhenium. The catalyst is provided with a carbon monoxide oxidation promoter in an amount particularly promoting the combustion of formed carbon monoxide to carbon dioxide within the regenerator. The oxidation promoter may be added in the form of separate discrete particles or it may be incorporated in the cracking catalyst employed in the FCC plant. The details of the composition and the method of incorporation of the carbon monoxide burning promoter are disclosed in detail in U.S. Pat. Nos. 4,072,600 and 4,093,535, the entire contents of both of which are incorporated herein by reference.

The section of the downflow FCC riser where the heat exchanging means is provided is referred to as the downstream section of the riser and it may begin at a distance in the riser immediately below the oil nozzle inlet and it may extend for the entire length of the riser. In a preferred embodiment, the heat exchanging means begins at a distance of 15% of the total riser length to 70% of the total riser length, and ends at a distance of between 20% and 90% of the total riser length. In the most preferred embodiment, the heat exchanging means begins at a distance of 20 to 50% of the total riser length and ends at a distance of 25 to 90% of the total riser length. The total riser length is defined herein as the length extending from the discharge of the feed oil nozzle and terminating at the point of exit of the mixture of the catalyst and cracked feed from the riser. Thus, in a typical riser measuring 120 feet in length, the heat exchanging means begins, in the most preferred embodiment, at a distance of 24 to 60 feet, and ends at a distance of 30 to 108 feet.

The heat exchanging means may be any conventionally known heat exchanging means used in the industry, such as a tube heat exchanger surrounding the downstream section of the riser, or a shell and tube heat exchanger.

The heat exchanging means may conveniently be operated by air in the FCC reactor wherein air is used for regenerating spent catalyst in the regenerating vessel. In that event, the air can be supplied to the heat exchanging means from the inlet of the regenerator vessel, as shown in one specific embodiment illustrated in FIG. 1 and discussed in detail below. However, it will be obvious to those skilled in the art that any other conventional heat exchanging material or medium, e.g., steam, may be used in the heat exchanging means as shown in the embodiment of FIG. 2, discussed below. If the heat exchanging means, e.g., a heat exchanger, is operated by air supplied from the inlet of the regenerating vessel, it must have a surface area of at least 1200 square feet ($ft^2$) to effect a temperature increase in the downflow riser top of about 5° F. Conversely, if steam is used as the heat exchanging medium, the surface area of the heat exchanging means must be at least 200 $ft^2$ to effect a similar temperature increase in the downflow riser top. It will be obvious to those skilled in the art that if higher or lower temperature increase in the regenerator is desired, the surface area of the heat exchanging means must be altered in a conventional manner. It will also be obvious to those skilled in the art that if the heat exchange means is operated by air, the air may be used in the heat exchanging means at the same temperature and pressure conditions at which it is supplied to the regenerating vessel to regenerate the catalyst.

The heat removed from the riser is conducted directly to the regenerating vessel, if air is used as the heat exchange medium. Conversely, if a heat exchange medium other than the catalyst regenerating medium is used, the heat exchange medium should not directly contact the catalyst in the regenerator. Therefore, the heat exchange medium (fluid) is circulated in a closed loop which preheats the regenerating medium upstream of the regenerator. In both cases, the net result of the heat exchange is a temperature increase of the catalyst in the regenerating vessel which, in turn, increases the rate of the regeneration reaction. The increased temperature in the regenerating vessel results in a more complete combustion of the coke which, in turn, provides a more completely regenerated catalyst having higher temperature. This regenerated high temperature catalyst is subsequently conducted to the top section of the downflow riser in a conventional manner, wherein the higher temperature of the catalyst facilitates more complete conversion of the oil feed, promotes higher gasoline and coke yield, and increases octane number of the gasoline produced in the process. A mixture of the oil feed and the hot regenerated catalyst now passes through the top section of the riser, wherein rapid conversion and cracking of the oil feed takes place, and then downwardly in the riser wherein conversion continues to take place. In the heat exchange section of the downflow riser, the heat exchanging means removes at least some of the heat from that section and transfers it to the regenerator vessel, as discussed above. Accordingly, the temperature in the riser, below the heat exchange means is not allowed to exceed certain limits, which can be set on a case-by-case basis for a particular process and feed. Consequently, the temperature in the remaining downstream portion of the riser may now be controlled so that the temperature at the outlet of the reactor vessel does not exceed the temperature which can be tolerated downstream in the process, e.g., in the distillation columns downstream of the FCC reactor, which usually cannot tolerate temperatures higher than 1040° F.

Figure 1:
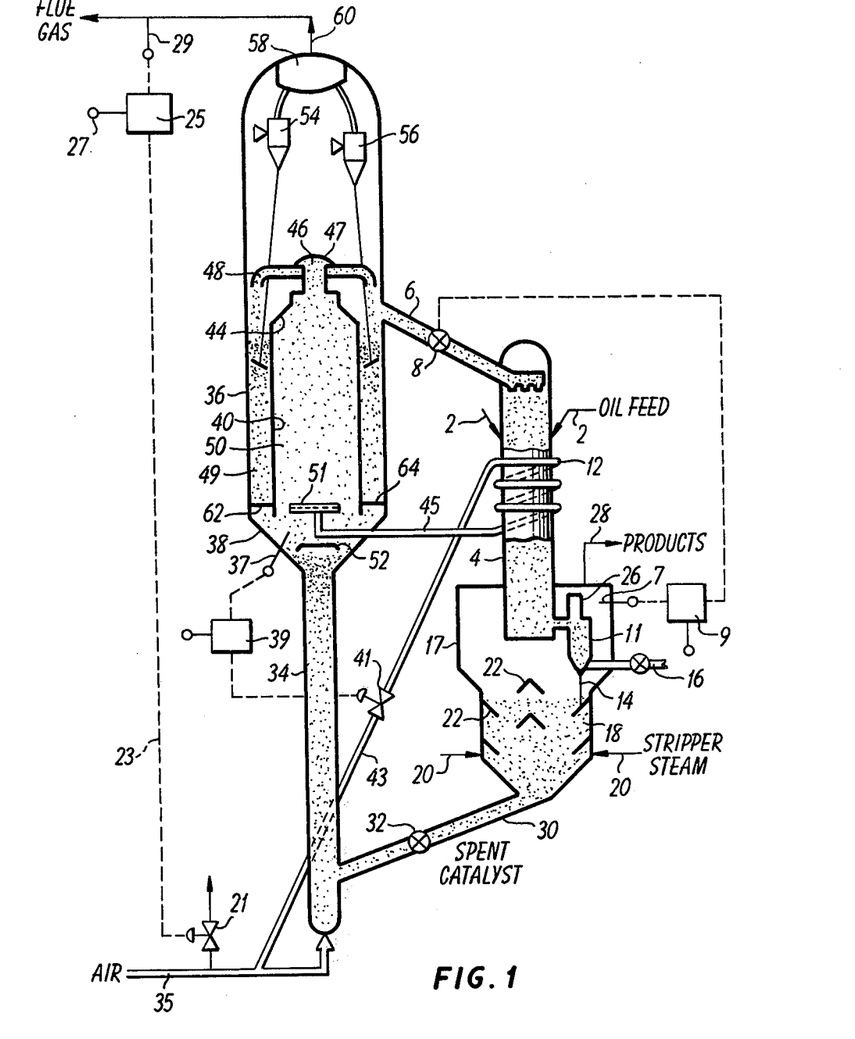
FIG. 1 is a schematic representation of a reactor vessel/regenerator vessel assembly of an FCC plant with air heat exchanging means surrounding the downflow riser.
Figure 2:
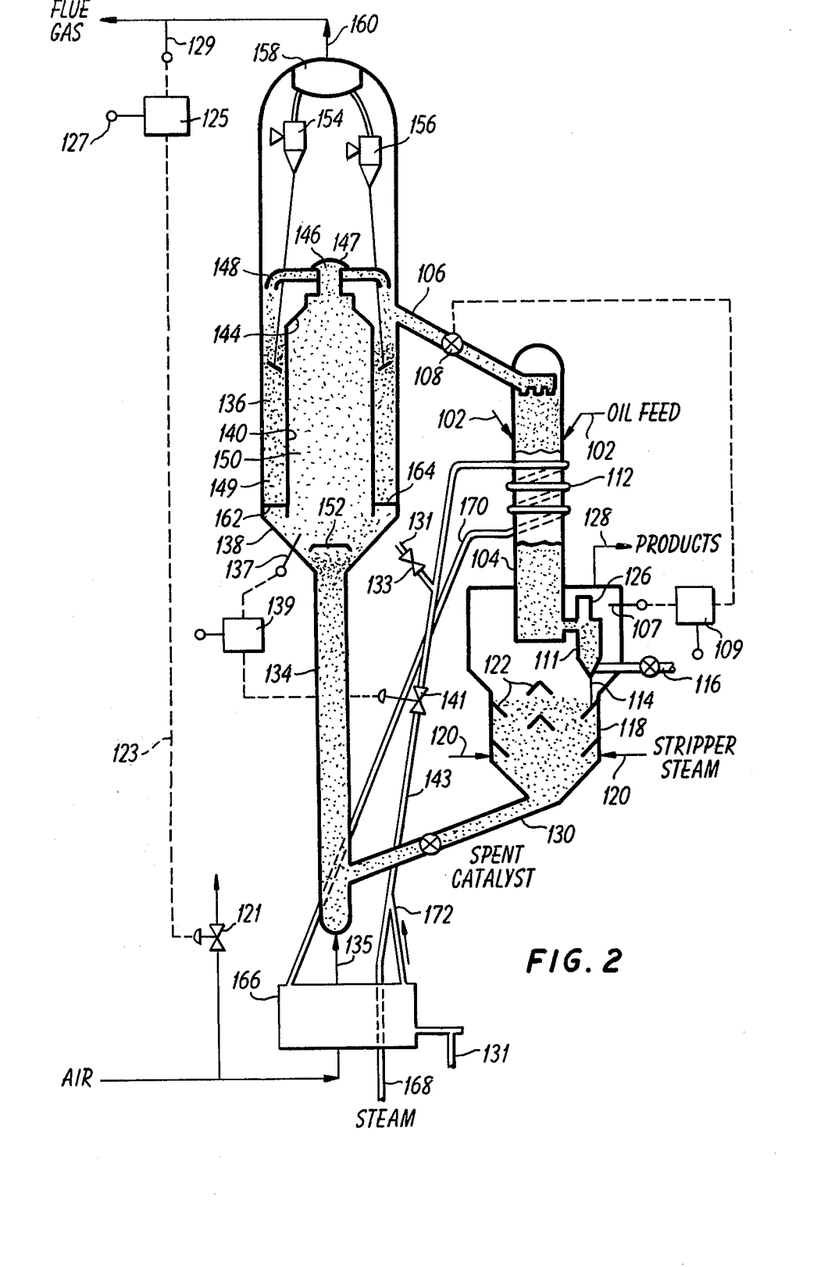
FIG. 2 is a schematic representation of a reactor vessel/regenerator vessel assembly of an FCC plant with steam heat exchanging means surrounding the downflow riser.

The temperature in the outlet section of the reactor is conventionally measured by a temperature sensing means, such as a thermocouple 7 shown in FIG. 1. The control loop of the thermocouple 7 usually controls the slide valve 8 in the conduit 6 leading from the regenerator to the upstream section of the riser. Accordingly, if some of the heat is removed from the riser before the heat-carrying mixture of catalyst and oil approaches the vicinity of the thermocouple 7, the thermocouple will sense lower temperature, and therefore would not alter the operation of the valve 8.

The heat exchanging means in the riser is controlled by a separate control loop, comprising a temperature sensing means, e.g., a thermocouple, placed in the lower section of the regenerator vessel, and a controller coupled thereto, which, in turn, is coupled to and controls a valve in a conduit delivering heat exchanging medium (e.g., air or steam) to the heat exchanging means of the riser. Thus, if the temperature sensed by the temperature sensing means in the lower section of the regenerator vessel is at the set point of the controller, the operation of the valve in the conduit for heat exchanging medium is not altered. However, once the temperature sensed by the heat exchanging means in the lower section of the regenerating vessel exceeds the set point, the controller activates the valve in the conduit through which the heat exchanging means is conducted, thereby decreasing the flow thereof to the heat exchanging means. Accordingly, less heat is transferred from the riser to the regenerator and the temperature of the catalyst in the regenerator decreases to about that of the set point of the controller. Conversely, if the temperature sensed by the heat sensing means in the lower section of the regenerator falls below the set point, the controller again activates the valve to increase the flow of the heat exchanging medium to the heat exchanging means thereby increasing the temperature in the regenerating vessel.

The apparatus used in the control loop for the heat exchanging means is that conventionally used in the art for measuring and controlling temperature of any process loop or parameter and its operation will be readily apparent to those skilled in the art.

The control set point for the control device can be set at any desired level depending on the type of oil feed used in the process, the type of catalyst, and the final product mix desired. However, the set point should be established at such a value that the temperature increase in the upstream or top section of the downflow riser resulting from the increased temperature of the catalyst is at least 2° F., preferably 5° F. to 50° F., and most preferably 10° F. to 30° F. Preliminary calculations indicate that a 5° F. to 10° F. temperature increase in the upstream section of the downflow riser would result in an increase of conversion by 0.5–1.0% and an increase in the octane number of gasoline obtained in the process by about 0.2–0.511.

When carbon monoxide burning catalysts or carbon monoxide promoters were used in prior art FCC processes, there was observed an increase in temperature in the regenerator because of additional conversion of carbon monoxide to carbon dioxide. As a result, the temperature of the regenerated catalyst introduced into the upstream section of the riser from the regenerator was also increased. Accordingly, the conventionally used temperature control loop discussed above, which maintained the temperature at the outlet portion of the FCC reactor at below the pre-set limit (e.g., 1000° F.), activated the slide valve in the regenerator-to-reactor conduit to decrease the rate of flwo of the hot regenerated catalyst to the upstream section of the riser. This change, of course, decreased the rate of conversion of the oil feed in the riser and octane number of the gasoline product.

However, if, in accordance with the present invention, a portion of the additional heat generated by the carbon monoxide (CO) burning catalyst is returned to the regenerator, before the heat reaches the outlet of the riser and of the reactor, the outlet reactor controller senses a lower outlet temperature increase, resulting in a smaller reduction of the catalyst circulation rate. In other words, the decrease in the circulation rate of the catalyst due to increased temperature in the regeneration vessel is smaller than it would otherwise be without the presence of the heat exchanging means in the downflow riser.

Similarly, any sudden decrease in the temperature of the regenerator can now be easily and relatively quickly corrected by increasing the flow of a heat exchanging medium to the heat exchange means in the downstream section of the riser. The increase in the rate of flow of the heat exchanging means, in response to the decreasing temperature in the regenerator, transfers additional heat to the regenerator, thereby correcting the temperature imbalance therein. It is well known in the art that any change in the operation of the regenerator of prior art FCC reactors which causes sudden temperature drop has a profound and lasting effect on the operation of the entire FCC system. More particularly, the sudden drop in the temperature of the regenerator must be remedied in the prior art systems by increasing the rate of catalyst flow from the regenerator to the upstream section of the riser. This, in turn, causes increased coke yield. Higher catalyst circulation rate results in an incompletely regenerated catalyst and in lower regenerator temperatures. The net result of all of these changes is a sudden and severe upset of heat balance between the FCC reactor and the regenerator. This condition is commonly known in the art as "wind-up". The symptoms of wind-up must be noticed quickly and corrective action taken immediately, for otherwise there is a danger of permanently upsetting the operation of the FCC reactor.

The use of the heat exchanging means, in accordance with the present invention, provides an expeditious method of controlling the wind down or the wind-up conditions, both discussed above, by transferring a portion of the heat from the riser to the regenerator vessel, and subsequently recycling the additional heat from the regenerator to the reactor through the hotter catalyst. In this manner, all of the heat generated internally in the process is conserved and used in the process without upsetting the delicate heat balance between the reactor and the regenerator vessels.

In a similar manner, the process of the present invention also affords a convenient means of maintaining the steady state heat balance of the FCC reactor which may otherwise be upset by changed product mix and/or operating conditions thereof.

The heat exchanging medium used in the heat exchanger is preferably the same medium, i.e., the same fluid, which is used for regenerating the catalyst in the regenerator vessel. The air regenerating medium is usually introduced through the bottom of the regenerator to provide efficient mixing of the regenerating medium with the coked catalyst. With the present invention, a portion of the air, e.g., about 10% of the stream, is diverted from the conduit introducing the regenerating medium into the regenerator vessel and it is passed through the heat exchanging means placed around the downflow riser. After passing through the heat exchanging means, the air is conducted into the regenerating vessel through a separate conduit, preferably terminating with a grid distribution pattern, separate and distinct from the primary inlet for the regenerating medium in the regenerating vessel, and it is discharged into the bed of catalyst in the regenerating vessel. The grid distribution pattern may be positioned above an inverted circular cup plate, preferably provided for distribution of the suspension, or at any other convenient location in the regenerator. It will be apparent to those skilled in the art that the exact location of the grid distribution pattern is not critical, as long as it efficiently transfers thermal energy from the riser to the regenerator.

It will be obvious to those skilled in the art that any conventional heat exchanging medium (fluid) may be used in the heat exchanging means of this invention. If the heat exchanging medium is other than that used for regenerating the catalyst in the regenerator vessel, it may be introduced from an outside source into the heat exchanging means, then conducted to a regenerating medium preheater upstream of the regenerator, and recycled back into the heat exchanging means. A suitable alternative heat exchanging fluid is steam, as discussed below in connection with the embodiment of FIG. 2.

The heat exchanging means placed around the downflow riser is preferably a conventional heat exchanger which allows the heat exchanging medium to pass directly in contact with the outer shell of the downstream section of the downflow riser, thereby enabling it to remove some of the thermal energy (heat) from the riser and transfer it to the heat exchanging medium. For greater contact surface area, the heat exchanging means may be comprised of a number of convoluted tubes surrounding the riser for a desired length thereof. However, it will be obvious to those skilled in the art that any conventionally known heat exchanging equipment can be placed around the riser, as long as the desired degree of heat exchange between the riser and the heat exchanging medium is accomplished.

As discussed above, the heat exchanging means is controlled and operated by a control loop, an essential element of which is a temperature sensing means placed in the regenerator vessel. The temperature sensing means is, e.g., a thermocouple, or any other conventionally used temperature sensing device.

The temperature sensing means is preferably placed downstream of the cup plate and of the grid distribution patterns introducing the catalyst regeneration medium and the heat exchanging medium, respectively, into the regenerating vessel. This preferred placement of the heat sensing means allows for thorough mixing of the catalyst before it comes into contact with the temperature sensing means of the control loop, thereby allowing the temperature sensing means to sense and record the temperature of the catalyst shortly after its introduction into the regenerator. However, it will be obvious to those skilled in the art that the exact location of the temperature sensing means is not critical, as long as it aids in maintaining the temperature at the outlet of the reactor vessel at the desired level. The optimum location of the heat sensing means can be easily determined by those skilled in the art on a case-by-case basis.

It will also be obvious to those skilled in the art that the FCC process and the apparatus of this invention are equipped with a number of other control loops conventionally used in the FCC installations, and that the operation of these conventional loops can be integrated with and/or can be kept independent of the operation of the control loop for the heat exchange means. Such conventionally used control loops are fully disclosed in the patents and publications cited above.

Thus, for example, the embodiment of FIG. 1, discussed in detail below, includes a conventional control loop (disclosed, e.g., in U.S. Pat. No. 4,093,537) controlling the rate of air flow into the regenerator. Such control loop includes a composition sensor 29 which indicates the carbon monoxide and oxygen content of the flue gas, and generates a signal indicative of that composition. Valve 21 is commonly controlled by operator intervention to control the flow of air and thus the CO and oxygen content of the flue gas. Alternatively, the signal generated by composition sensor 29 is transmitted to the composition controller 25. The controller 25, equipped with set points 27, places a signal on line 23, which signal is indicative of the deviation of the carbon monoxide composition of the flue gas from the set point 27 to adjust the control valve 21 in a direction to reduce the deviation of the measured composition from the predetermined composition as defined by the set point 27. In general, the set point is adjusted to a CO content less than 2000 ppm, and the flue gas, in general, will contain about 2% excess oxygen gas. A similar conventional air rate control loop is provided in the embodiment of FIG. 2 with all of the parts of the loop numbered in a manner similar to that of FIG. 1 with a prefix of 100, e.g., the controller 125 in FIG. 2 corresponds to the controller 25 in FIG. 1, etc. It will be apparent to those skilled in the art that the air rate control loop of the embodiment of FIG. 2 operates in a manner identical to that of the embodiment of FIG. 1.

In reference to FIG. 1, exemplifying one of the embodiments of the present invention, a hydrocarbonaceous feed, e.g., gas oil or higher boiling material is introduced through a conduit 2 to the top section of riser reactor 4. Hot regenerated catalyst is also introduced to the top section of the riser by a stem pipe 6 equipped with a flow control valve 8. The degree of opening of the control valve 8 is regulated by a control loop comprised of a temperature sensing means 7 at the top of the reactor 17 and a controller 9, of a conventional type. A vapor liquid suspension is formed in the top section of the riser 4 at an elevated temperature of about 950° F., and usually at about 980° F. The temperature range of the suspension may vary from 980° F. to 1200° F., and is usually at least 1000° F., depending on the degree of the hydrocarbon conversion desired and on the composition of the feed. The suspension formed in the riser is passed downwardly through the riser under selected temperature and residence time conditions. The residence time of the hydrocarbon charge stock in the riser is about 0.2 to about 10 seconds, preferably about 0.3 to about 4 seconds, before the suspension passes through suitable separating means, such as a series of cyclones 11 (shown for clarity in FIG. 1 as a single cyclone), rapidly effecting separation of catalyst particles from vapor hydrocarbon conversion products. The separator means 11, along with the outlet end of the riser 4 is housed in a larger, upper section of the reactor, designated herein as a receiving and catalyst collecting vessel 17. Catalyst particles separated in the separator means 11 pass countercurrently in contact with stripping gas introduced by conduit 16 to a lower portion of the cyclone. The thus contacted and separated catalyst is withdrawn by a dipleg 14 for discharge into a bed of catalyst in the lower section of the reactor.

The lower section of the reactor vessel has generally a smaller diameter than the upper portion thereof, and it comprises a catalyst stripping section 18, into which a suitable stripping gas, such as steam, is introduced, e.g., by a conduit 20. The stripping section is provided with a plurality of baffle means 22 over which the downflowing catalyst passes countercurrently to the upflowing stripping gas.

A conventional separating means, not shown for clarity, is provided in the upper portion of the vessel 17 for recovering stripped hydrocarbon products and stripping gas from entrained catalyst particles. As is well known in the art, there may also be provided a second sequential stage (not shown in FIG. 1 for clarity) of catalyst separation for product vapors discharged from the separator 11 by conduits 26 and 28.

Stripped catalyst containing carbonaceous deposits of the riser conversion section is withdrawn from the bottom of the stripping section at an elevated temperature, e.g., at 1000° F., by a standpipe or conduit 30, equipped with a flow control valve 32. The catalyst is then passed from the standpipe 30 into the bottom portion of the regenerator riser 34. A lift gas is introduced into the bottom of riser 34 through a conduit 35. The lift gas, e.g., a preheated air, hot flow gas, oxygen supplemented flow gas, is introduced through the conduit 35 at a temperature of about 300° to 500° F. and a pressure of about 40 p.s.i.g. The amount of lift gas introduced into the regenerator riser is sufficient for forming a suspension of the catalyst in the lift gas, which suspension is forced to move upwardly through the riser 34 under incipient or partial regenerator conditions and into the bottom portion of an enlarged regenerator vessel 36. An inverted circular cup plate 52 may be used if desired to accomplish the distribution of the suspension. In addition, a distributor grid 51, connected to the conduit 45 of the heat exchanger 12, is used in the lower portion of vessel 40 above the inverted circular cup plate 52. Regenerator vessel 36 comprises a bottom closure member 38, shown in FIG. 1 to be conical in shape. Other suitable shapes obvious to those skilled in the art, may also be employed, such as rounded dish shapes.

The regenerator vessel 36 comprises in the lower section thereof a smaller diameter cylindrical vessel means 40 provided with a cylindrical bottom containing a cylindrical opening in the bottom thereof, whose cross-section is at least equal to the cross-section of the riser 34. An outer annular space 49 is formed by the chamber 36 and by the vessel 40, and it serve to recirculate regenerated catalyst.

Vessel 40 is provided with a conical head member 46 terminating in a relatively short cylindrical section of sufficient vertical height and capped at its upper end by means 47 to accommodate a plurality of radiating arm means 48. The radiating arm means 48 are opened in the bottom side thereof because they are "U" shaped tunnels in cross-section, and they operate to discharge a concentrated stream of catalyst substantially separated from combustion product gases generally downward into the space 49. A substantial portion, e.g., 50 percent, of the regenerated catalyst discharged by the arms 48 is conducted into the stem pipe 6 and then into the downflow riser 4. Vessel 40 is herein referred to as the combustor vessel, because in this portion of the regenerator the combustion of carbonaceous material and of the carbon monoxide formed during the combustion is particularly promoted. As stated above, the cataylst used in the process may incorporate a carbon monoxide (CO)-burning promoter, e.g., platinum, palladium, iridium, osmium, rhodium, ruthenium and rhenium, described in detail in U.S. Pat. Nos. 4,072,600 and 4,093,535, the entire contents of both of which are incorporated herein by reference.

In the upper portion of vessel 36, a plurality of cyclonic separators 54 and 56 is provided for separating combustion flue gases from entrained catalyst particles. The separated flue gases pass into plenum 58 for withdrawal by a conduit 60. If significant combustion of carbon monoxide takes place in the upper portion of vessel 36, above the annulus 44, a heat absorbing catalyst may be used in the process to improve the heat recovery efficiency of the operation.

The regenerator vessel described above and shown in FIG. 1 and the method of operation thereof is designed to maintain during operation a substantial mass or bed of fluid regenerated catalyst particles in the outer annular zone 49. Fluidizing gas (i.e., regenerating medium), which usually contains oxygen to achieve complete combustion of carbonaceous deposits on the catalyst, is introduced into the lower portion of the annular zone or segments of the annular zone by conduits 62 and 64. The designation "segments" is intended to mean that only selected vertically oriented portions of the annular section 49 beneath the discharge of radiating arms 48 contain regenerated catalyst. Thus, with this arrangement, the volume of regenerated catalyst retained in the annular zone 49 can be considerably reduced over that retained by using the total annulus. On the other hand, sufficient amount of regenerated catalyst must be retained by the annular zone 49 to permit the method of operation described herein and to maintain the heat balance between the reactor vessel and the regenerator vessel. The catalyst regenerator operation illustrated herein is designed to provide regenerated catalyst at an elevated temperature above 450° F., and preferably at 1300° to 1500° F., having residual coke on catalyst of less than about 0.15 and preferably 0.01 to 0.05 weight percent. However, the process of the present invention can be successfully used with any regenerator operation coupled to an FCC reactor. Accordingly, the regenerator operation illustrated in the embodiment of FIG. 1 is used as an example of one suitable regenerator and is not to be considered a limitation of the utility of the present invention.

A portion of the regenerated catalyst at an elevated temperature of at least 1200° F. is recycled by the catalyst pressure head developed in the annular zone 49 for admixture with the spent catalyst passing from the riser 34 into the combustion section. The amount of recycle of regenerated catalyst for admixture with spent catalyst is essentially self-controlling, once certain operating flow characteristics are established in the process, such as the catalyst flow rate to the hydrocarbon conversion zone (the reactor vessel), catalyst make-up rate to the operation, and the flow rate of the suspension passing upwardly through riser 34 and combustion section 40 of the regenerator. Thus, the suspension of catalyst being subjected to regenerating conditions passes through gradations of catalyst particle concentration or density for a given volume within the range of about 35 lbs/ft³ to about 10 lbs/ft³. Consequently, the combustion section 40 is not necessary to maintain a dense fluid bed of catalyst with a significant interface between a more dispersed phase of catalyst above the combustion section. On the other hand, the upflowing mass of catalyst may be maintained relatively uniform in density until it encounters the conical head section and radiating discharge arms, which accelerate the flow of the suspension and thus reduce the particle concentration per given volume.

Regenerated catalyst collected in the annulus or a section of the annulus, or a portion of the regenerated catalyst discharged by the arms 48, is withdrawn by a standpipe 6 for passage to the riser hydrocarbon conversion zone 4. As mentioned above, the standpipe 6 is equipped with a control valve 8, operated by a control loop comprising the thermocouple 7 and the controller 9 connected to the valve 8. The function of the thermocouple 7 and the controller 9 is to assure that the temperature of the mixture of hydrocarbon products and stripping gas withdrawn through the conduit 28 does not exceed a limit allowable for downstream processing of the hydrocarbon products, e.g., about 1000° F. Thus, if the temperature sensed by the thermocouple 7 exceeds that limit, the opening of the valve 8 is decreased, thereby decreasing the rate of flow of hot regenerated catalyst into the riser 4 and decreasing the temperature of the hydrocarbon products exiting through the conduit 28. Conversely, if the temperature sensed by the thermocouple 7 is lower than the 1000° F. set point of the controller 9, the opening of the valve 8 is increased, thereby allowing for a higher rate of flow of the regenerated catalyst into the riser 4, resulting in a higher conversion ratio and higher temperatures sensed by the thermocouple 7. However, as mentioned above, the use of the heat exchanger 12 in the downflow riser enables one to cycle the regenerated catalyst into the riser at a higher rate with the resulting increase in the rate of conversion of the oil and increased octane number of the gasoline produced, without the thermocouple 7 sensing unduly high temperature levels.

A tubular heat exchanger 12 surrounds the lower or downstream section of the riser. The heat exchanger is operated with air conducted thereto through a conduit 43, branched off from a conduit 35 supplying the air to the regenerator vessel 36. The air (at the rate of, e.g., about 32,000 lbs/hr) enters the heat exchanger through the conduit 43 at a temperature of about 300°–500° F. and pressure of 25-40 p.s.i.g., and exits the heat exchanger through a conduit 45 at the temperature of about 375° to 575° F. and pressure of 24 to 39 p.s.i.g. and is thereafter conducted to a grid distribution 50 in the regenerating vessel, whereby it is discharged into the bed of catalyst particles.

A thermocouple 37 is placed in the bottom section of the regenerator vessel 36, just above the cup plate 52. The thermocouple 37 measures the temperature of the catalyst in the regenerator bed, shortly after its introduction from the reactor to the regenerator and conveys those measurements to a controller 39 which compares them with the set point thereof to arrive at a value of catalyst temperature deviation. If the temperature sensed by the thermocouple 37 is below that of the set point in the controller 39, the controller 39 causes a valve 41 to open wider, thereby permitting a larger volume of the fluid introduced through a conduit 35 to flow into the heat exchanger. Conversely, if the temperature sensed by the thermocouple 37 is above the set point in the controller 39, the opening of the valve 41 is decreased, thereby decreasing the rate of flow of the fluid through the conduit 43. These changes result in the decrease of the value of the catalyst temperature deviation.

In the upper portion of vessel 36, a plurality of cyclonic separators 54 and 56 is provided for separating combustion flue gases from entrained catalyst particles. The separated flue gases pass into plenum 58 for withdrawal by a conduit 60. If significant combustion of carbon monoxide takes place in the upper portion of vessel 36, above the annulus 44, a heat absorbing catalyst may be used in the process to improve the heat recovery efficiency of the operation.

In an alternative embodiment illustrated in FIG. 2, the heat exchanging medium is steam. Accordingly, the heat exchanging means is designed to prevent direct contact of steam with the catalyst being regenerated in the regenerator vessel. A stream of steam, from an outside, source at about 420° F. and 320 psig, enters a heat exchanger 112 through conduits 168 and 143. A portion of thermal energy is transferred from the riser 104 to the steam in the heat exchanger 112. The steam exits the heat exchanger at about 470° F. and 530 psig and is then directed via a conduit 170 to a preheater 166 where the air used to regenerate the catalyst is preheated with the steam before its introduction into the regenerator. The steam exits the preheater 166 through a conduit 172, and is then combined with the fresh steam in conduit 143. The air preheater 166 is any conventional heat exchanging means, e.g., a shell and tube heat exchanger. A thermocouple 137 senses the temperature of the catalyst in the regenerator and conveys those measurements to a controller 139, which compares them with the set point of the controller to arrive at a value of catalyst temperature deviation. If the temperature measured by the thermocouple 137 is below the set point of the controller, the controller 139 causes valve 141 to open wider, thereby forcing a larger volume of the steam to flow into the heat exchanger 112. Conversely, if the temperature sensed by the thermocouple 137 is above the set point of the controller 139, the opening of the valve 141 is decreased and less steam flows into the heat exchanger 112. These changes result in the decrease of the value of the catalyst temperature deviation. The air preheater 166 is also equipped with a conduit 131, optionally containing a valve, not shown in the drawing, for the removal of steam condensate. A valve 133 and a conduit 131 in the steam conduit 143 provide a means for venting excess steam.

Aside from the use of the air preheater 166 and other auxiliary equipment associated with the steam heat exchange means, the embodiment of FIG. 2 uses equipment identical to that of the embodiment of FIG. 1, and it is operated in a manner identical to the embodiment of FIG. 1. All of the parts of the apparatus of FIG. 2 are numbered in a manner similar to that of FIG. 1 with a prefix of 100, e.g., oil feed inlet 2 in FIG. 1 corresponds to feed inlet 102 in FIG. 2, etc. It is believed that further operation of the embodiment of FIG. 2 will be apparent to those skilled in the art from the detailed description of operation of the embodiment of FIG. 1, above.

As mentioned above, the catalyst regeneration system of this invention contemplates providing the catalyst with a carbon monoxide oxidation promoter in an amount particularly promoting the combustion of formed carbon monoxide to carbon dioxide within the region of high particle concentration in the combustor. The oxidation promoter may be added in the form of separate discrete catalyst particles or it may be incorporated in the cracking catalyst employed in the operation. Substantially any suitable cracking catalyst may be employed in the system of this invention, e.g., an amorphous catalyst, a crystalline alumina silicate catalyst or a mixture thereof. The process and apparatus of this invention is however particularly useful with higher and lower activity, preferably low coke-producing crystalline zeolite cracking catalyst comprising faujasite crystalline zeolites and other zeolites known in the art in a regeneration procedure particularly promoting the recovery of available heat generated by the burning of carbonaceous deposits produced in hydrocarbon conversion, such as the catalysts disclosed in U.S. Pat. Nos. 3,748,251 and 3,886,060, the entire contents of both of which are incorporated herein by reference.

Similarly, the process of this invention can be used with any suitable feed material which can be processed in the FCC reactors. Such suitable feed materials include any conventional hydrocarbon feedstocks, e.g., naphthas, gas oil, vacuum gas oil, light and heavy distillates, residual oils and the like.

It will be apparent to those skilled in the art that the above example and general description of the process can be successfully repeated with ingredients equivalent to those generically or specifically set forth above and under variable process conditions.

From the foregoing specifications, one skilled in the art can readily ascertain the essential features of this invention and without departing from the spirit and scope thereof can adopt it to various diverse applications.

What is claimed is:

1. A fluid catalytic cracking process comprising admixing a hydrocarbonaceous feed with a regenerated catalyst in the top section of a downflow reactor riser, passing the hydrocarbonaceous feed and the catalyst admixed therewith through the downstream section of the riser, thereby effecting cracking of the hydrocarbonaceous feed at the process temperature under endothermic process conditions and deactivating the catalyst by deposition of carbonaceous deposits thereon, separating the deactivated catalyst from the cracked hydrocarbonaceous feed, passing the deactivated catalyst to a regenerator vessel wherein the carbonaceous deposits are removed from the deactivated catalyst under exothermic process conditions by means of a regenerating medium introduced into the regenerator vessel by a regenerating medium distribution means, thereby regenerating and heating the catalyst, passing the regenerated hot catalyst to the top section of the downflow reactor riser, and transferring at least a portion of the thermal energy by heat exchanging means from the downflow riser to the regenerator vessel.

2. A process according to claim 1, wherein the heat exchanging means comprises an air heat exchanger.

3. A process according to claim 1, wherein the heat exchanging means comprises a steam heat exchanger.

4. A process according to claim 2, wherein the catalyst contains carbon monoxide burning promoter.

5. A process according to claim 3, wherein the catalyst contains carbon monoxide burning promoter.

6. A process according to claim 2, wherein the portion of the thermal energy transferred to the regenerator vessel is introduced into the regenerator vessel above the regenerating medium distribution means.

7. A process according to claim 3, wherein the portion of the thermal energy transferred to the regenerator vessel is introduced into the regenerator vessel above the regenerating medium distribution means.

8. A process according to claim 6, wherein the air heat exchanger is controlled by a temperature sensing means placed in the regenerator vessel below the point of introduction of the portion of the thermal energy into the regenerator vessel.

9. A process according to claim 7, wherein the steam heat exchanger is controlled by a temperature sensing means placed in the regenerator vessel below the point of introduction of the portion of the thermal energy into the regenerator vessel.

10. A process according to claim 8, wherein the air heat exchanger has the surface area of at least 1200 square feet.

11. A process according to claim 9, wherein the steam heat exchanger has the surface area of at least 200 square feet.

12. A process according to claim 10, wherein the carbonaceous deposits are removed from the deactivated catalyst by air having a temperature of 300° to 500° F.

13. A process according to claim 11, wherein the carbonaceous deposits are removed from the deactivated catalyst by air having a temperature of 300° to 500° F.

14. A process according to claim 12, wherein the air heat exchanger is placed about the downflow riser at a distance beginning at 15% to 70% of the total downflow riser length and terminating at a distance of 20% to 90% of the total downflow riser length.

15. A process according to claim 13, wherein the steam heat exchanger is placed about the downflow riser at a distance beginning at 15% to 70% of the total downflow riser length and terminating at a distance of 20% to 90% of the total riser length.

16. A process according to claim 15, wherein the steam, after passing through the steam heat exchanger, is conducted to a regenerating medium preheating means to preheat the regenerating medium before the introduction thereof into the regenerator vessel.

17. A process according to claim 1 further comprising a method for controlling said process, which comprises
comparing the temperature of the catalyst in the regenerator vessel with a predetermined temperature to obtain a catalyst temperature deviation; and
controlling the rate of flow of a heat exchanging medium into the heat exchanging means in a direction to reduce the temperature deviation.

18. A fluid catalytic cracking process comprising admixing a hydrocarbonaceous feed with a regenerated catalyst in the top section of a downflow reactor riser, passing the hydrocarbonaceous feed and the catalyst admixed therewith through the downstream section of the riser, thereby effecting cracking of the hydrocarbonaceous feed at the process temperature under endothermic process conditions and deactivating the catalyst by deposition of carbonaceous deposits thereon, separating the deactivated catalyst from the cracked hydrocarbonaceous feed, passing the deactivated catalyst to a regenerator vessel wherein the carbonaceous deposits are removed from the deactivated catalyst under exothermic process conditions by means of a regenerating medium introduced into the regenerator vessel by a regenerating medium distribution means, thereby regenerating and heating the catalyst, passing the regenerated hot catalyst to the top section of the downflow reactor riser, and transferring at least a portion of the thermal energy by heat exchanging means from the downflow riser to the regenerator vessel, thereby recovering an improved yield of gasoline product having higher octane over that obtainable at the same reactor vessel outlet temperature without the heat exchanging means.

19. A process according to claim 14, wherein the air heat exchanger is placed about the downflow riser at a distance beginning at 20% to 50% of the total downflow riser length and terminating at a distance of 25% to 90% of the total downflow riser length.

20. A process according to claim 15, wherein the steam heat exchanger is placed about the downflow riser at a distance beginning at 20% to 50% of the total downflow riser length and terminating at a distance of 25% to 90% of the total downflow riser length.

21. A process according to claims 1, 15, 16, 17, 18, 19 or 20, wherein the temperature in the upstream section of the downflow riser is increased by at least 2° F. over that obtainable without the heat exchanging means.

22. A process according to claim 21, wherein the temperature in the upstream section of the downflow riser is increased by 5° F. to 50° F.

23. A process according to claim 22, wherein the temperature in the upstream section of the down flow riser is increased by 10° F. to 30° F.

24. A fluid catalytic cracking apparatus comprising a reactor vessel and a regenerator vessel, said reactor vessel comprising a downflow riser divided into an upstream and a downstream section, said downflow riser being equipped with a heat exchanging means for transferring at least a portion of thermal energy from said downflow riser to said regenerator vessel, said regenerator vessel comprising a regenerating medium inlet conduit cooperating with a regenerating medium distribution means in the lower section thereof and a solid-gas separation means in the upper section thereof, a means for conveying a deactivated catalyst from said reactor vessel to said regenerator vessel, a means for conveying a regenerated catalyst froom said regenerator vessel to said reactor vessel, a first means for sensing temperature at the outlet of said reactor vessel, said first means for sensing temperature controlling said means for conveying the regenerated catalyst from said regenerator vessel to said reactor vessel.

25. An apparatus according to claim 24, wherein said heat exchanging means is an air heat exchanger.

26. An apparatus according to claim 24, wherein said heat exchanging means is a steam heat exchanger.

27. An apparatus according to claim 25, wherein said air heat exchanger introduces said portion of thermal energy into said regenerator vessel above said regenerating medium distribution means.

28. An apparatus according to claim 26, wherein said steam heat exchanger introduces said portion of thermal energy into said regenerator vessel above the regenerating medium distribution means.

29. An apparatus according to claim 27 further comprising a second temperature sensing means, placed in said regenerator vessel below the point of introduction of said portion of thermal energy by said air heat exchanger into said regenerator vessel, to control said air heat exchanger.

30. An apparatus according to claim 28 further comprising a second temperature sensing means, placed in said regenerator vessel below the point of introduction of said portion of thermal energy by said steam heat exchanger into said regenerator vessel, to control said steam heat exchanger.

31. An apparatus according to claim 29, wherein said air heat exchanger has the surface area of at least 1200 square feet.

32. An apparatus according to claim 30, wherein said steam heat exchanger has the surface area of at least 200 square feet.

33. An apparatus according to claim 31, wherein said air heat exchanger is placed about the downflow riser at a distance beginning at 15% to 70% of the total downflow riser length and terminating at a distance of 20% to 90% of the total downflow riser length.

34. An apparatus according to claim 32, wherein said steam heat exchanger is placed about the downflow riser at a distance beginning at 15% to 70% of the total downflow riser length and terminating at a distance of 20% to 90% of the total downflow riser length.

35. An apparatus according to claim 33, wherein said air heat exchanger is placed about the downflow riser at a distance beginning at 20% to 50% of the total downflow riser length and terminating at a distance of 25% to 90% of the total downflow riser length.

36. An apparatus according to claim 34, wherein said steam heat exchanger is placed about the downflow riser at a distance beginning at 20% to 50% of the total downflow riser length and terminating at a distance of 25% to 90% of the total downflow riser length.

37. A fluid catalytic cracking apparatus comprising a reactor vessel and a regenerator vessel, said reactor vessel comprising a downflow riser divided into an upstream section and a downstream section, said regenerator vessel comprising a regenerating medium inlet conduit cooperating with a regenerating medium distribution means in the lower section thereof and a solid-gas separation means in the upper section thereof, a means for conveying a deactivated catalyst from said reactor vessel to said regenerator vessel, a means for conveying a regenerated catalyst from said regenerator vessel to said reactor vessel, a first means for sensing temperature at the outlet of said reactor vessel, said first means for sensing temperature controlling said means for conveying the regenerated catalyst from said regenerator vessel to said reactor vessel;

said downflow riser being equipped with an air heat exchanger for transferring at least a portion of thermal energy from said downflow riser to said regenerator vessel, said portion of thermal energy being introduced into said regenerator vessel above the regenerating medium distribution means;

a second temperature sensing means, placed in said regenerator vessel below the point of introduction of said portion of thermal energy by said air heat exchanger into said regenerator vessel to control said air heat exchanger;

said air heat exchanger being placed about the downflow riser at a distance beginning at 15% to 70% of the total downflow riser length and terminating at a distance of 20% to 90% of the total downflow riser length;

said air heat exchanger having a surface area of at least 1200 square feet.

38. A fluid catalytic cracking apparatus comprising a reactor vessel and a regenerator vessel, said reactor vessel comprising a downflow riser divided into an upstream section and a downstream section, said regenerator vessel comprising a regenerating medium inlet conduit cooperating with a regenerating medium distribution means in the lower section thereof and a solid-gas separation means in the upper section thereof, a means for conveying a deactivated catalyst from said reactor vessel to said regenerator vessel, a means for conveying a regenerated catalyst from said regenerator vessel to said reactor vessel, a first means for sensing temperature at the outlet of said reactor vessel, said first means for sensing temperature controlling said means for conveying the regenerated catalyst from said regenerator vessel to said reactor vessel;

said downflow riser being equipped with a steam heat exchanger for transferring at least a portion of thermal energy from said downflow riser to said regenerator vessel, said portion of thermal energy being introduced into said regenerator vessel above the regenerating medium distribution means;

a second temperature sensing means, placed in said regenerator vessel below the point of introduction of said portion of thermal energy by said steam heat exchanger into said regenerator vessel to control said steam heat exchanger;

said steam heat exchanger being placed about the downflow riser at a distance beginning at 15% to 70% of the total downflow riser length and terminating at a distance of 20% to 90% of the total downflow riser length;

said steam heat exchanger having a surface area of at least 200 square feet.

* * * * *